United States Patent [19]

Flotow et al.

[11] Patent Number: 5,080,212
[45] Date of Patent: Jan. 14, 1992

[54] POSITIONING PIN SETTING ARRANGEMENT

[75] Inventors: Richard A. Flotow, Butler; Michael D. Pedue, Granger, both of Ind.

[73] Assignee: 501 Dana Corporation, Toledo, Ohio

[21] Appl. No.: 630,688

[22] Filed: Dec. 20, 1990

[51] Int. Cl.⁵ .............................................. F16D 13/54
[52] U.S. Cl. .......................... 192/70.25; 192/111 A; 192/70.28
[58] Field of Search ............. 192/70.25, 111 A, 70.18, 192/70.19, 70.28

[56] References Cited

U.S. PATENT DOCUMENTS

| | | | |
|---|---|---|---|
| 2,115,252 | 4/1938 | Carlson | 192/68 |
| 2,324,613 | 7/1943 | Criley | 192/70.25 |
| 2,366,610 | 1/1945 | Godfrey | 192/69 |
| 2,913,082 | 11/1959 | Becknell | 192/70.25 X |
| 3,360,089 | 12/1967 | Cockerill et al. | 192/111 |
| 3,871,499 | 3/1975 | Kazuma | 192/70.18 X |
| 4,368,810 | 1/1983 | Maucher et al. | 192/70.25 X |
| 4,601,373 | 7/1986 | Despres et al. | 192/70.18 |
| 4,640,399 | 2/1987 | Börjesson | 192/70.25 |
| 4,715,484 | 12/1987 | Flotow | 192/70.25 |
| 4,809,834 | 3/1989 | Channing | 192/70.18 X |

Primary Examiner—Leslie A. Braun
Assistant Examiner—Andrea Pitts
Attorney, Agent, or Firm—Dykema Gossett

[57] ABSTRACT

A setting pin assembly is disclosed for properly positioning a positioning pin in a two disc clutch. In one embodiment, the setting pin assembly is slidably received in an aperture in a clutch cover, with the aperture being coaxial to the positioning pin. The setting pin preferably has enlarge portions at each axial end of the clutch cover. The enlarged portion on the inner end of the setting pin transmits force to the positioning pin over a relatively great surface area. A spring is preferably mounted between the clutch cover and the enlarged portion at the outer end of the setting pin, to normally bias the setting pin outwardly of the clutch cover and force the enlarged portion on the inner end of the clutch cover against the aperture. The setting pin extends outwardly of the clutch cover, and by merely contacting the setting pin with a hammer or similar tool the positioning pin may be moved to a proper position.

18 Claims, 2 Drawing Sheets

POSITIONING PIN SETTING ARRANGEMENT

BACKGROUND OF THE INVENTION

This application relates to a clutch having two driven discs. More particularly, the present invention relates to an assembly for properly positioning an intermediate plate relative to the two driven discs.

Clutches having a pair of driven discs with an intermediate plate dipsosed between the discs are known. A flywheel is disposed at one end of the two dics and is fixed to a clutch cover at the other end of the two discs to enclose the clutch. Rotational velocity is selectively transmitted from the flywheel to drive the discs.

The intermediate plate between the two discs must be accurately positioned to provide proper clearance between the discs and the intermediate plate. Several prior art systems have developed various arrangements to properly position this intermediate plate. In one system, a plurality of positioning pins slidably mounts the intermediate plate between the two discs. The positioning pins and intermediate plate move a small distance with clutch engagement towards the flywheel. When the clutch is disengaged the intermediate plate and positioning pin move the same small distance away from the flywheel. The intermediate plate will typically be frictionally engaged on the positioning pin such that it may move along the positioning pin towards the flywheel to compensate for wear on the discs.

In initially positioning the intermediate plate, the clutch is engaged and the positioning pins are forced into contact with the flywheel and move relative to the intermediate plate. With the clutch engaged, the intermediate plate is in the proper position for clutch engagement. Thus, the intermediate plate is positioned on the positioning pins in the proper clutch engaged position whenever the positioning pins are in contact with the flywheel. Once the clutch has been initially set up, the positioning pins provide a stop for movement of the intermediate plate against the flywheel which defines the proper clutch engage position. The clutch cover typically provides a stop for the clutch disengaged position.

Problems have arisen in these prior art clutches since the clutch cover blocks access to the positioning pins making it difficult to initially position them relative to the flywheel. In response to this problem some prior art clutches have provided an aperture through the cover for each positioning pin, and some member is inserted through this aperture to contact the positioning pin and force it against the flywheel. Typically, a set pin is inserted through the aperture in the cover and is hit with a hammer or similar tool to move the positioning pin to a desired position. Such a system is disclosed in U.S. Pat. No. 4,601,373.

While the above-described prior art clutch does overcome some problems, there are still deficiencies in the clutch. First, a set pin inserted through the aperture to contact the positioning pin and force it against the flywheel, may not be directed along an axis coaxial to the positioning pin. Thus, the force transmitted to the positioning pin could be skewed off the axis of the positioning pin. The positioning pin may bind within the intermediate plate, and result in some misalignment. Further, these prior art systems require close work to initially position the intermediate plate since the set pin must be inserted into each of the apertures individually to ensure proper placement of the positioning pins.

In the prior art, the aperture through the cover could not be coaxial with the positioning pin since the cover provides a stop for the positioning pin in the disengaged position. Movement of the positioning pin to the clutch disengaged position might cause it to move into the aperture, which would be undesirable. As an alternative, it was suggested that the aperture be made of a smaller diameter than the diameter of the positioning pin. These two requirements resulted in a problem with some prior art systems wherein the force transmitted to the positioning pin was directed along an axis that was not coaxial to the axis of the positioning pin, and was also over a relatively small surface area.

It is an object of the present invention to overcome the above-discussed limitations in the prior art clutches.

SUMMARY OF THE INVENTION

In a disclosed embodiment of the present invention, an intermediate plate mounted on a positioning pin is disposed between a pair of driven discs. The positioning pin positions the intermediate plate relative to the two discs. A cover encloses the discs, intermediate plate and positioning pins to enclose the clutch assembly. Access apertures are formed through the cover to allow access to the positioning pins from outside of the cover.

In a preferred embodiment of the present invention, the access apertures slidably receive a setting pin which extends outwardly of the cover. The setting pin may be hit by a hammer or similar tool to move against the positioning pin and properly position the positioning pin relative to the intermediate plate. Preferably, the positioning pins abut a flywheel to define the proper position for the positioning pin.

In a most preferred embodiment of the present invention, there are a plurality of such positioning pins and setting pins. Further, in a most preferred embodiment of the present invention, each setting pin is spring biased outwardly of the apertures in the cover. Even more preferably, each setting pin has a pair of enlarged portions spaced on each axial side of the aperture in the cover such that the setting pin will not move outwardly of the cover. The setting pin enlarged portion on the inside of the cover provides a stop to prevent pin movement outwardly of the aperture. The enlarged portion on the outside of the cover prevents the setting pin from being moved too far into the clutch and in addition, provides a shoulder for the spring which biases the setting pin outwardly of the clutch cover. Most preferably, the spring is a conical spring.

In disclosed embodiments of the present invention, the aperture in the clutch cover may be a cylindrical aperture or, alternatively a notch formed at the outer periphery of the cover.

With the disclosed setting pin assembly, a force transmitted to the setting pin will be transmitted along the axis of the positioning pin. The setting pin is properly guided within the aperture and moves along the proper axis to contact and move the positioning pin. Also, the force is transmitted from the enlarged portion on the inside end of the setting pin, and is thus over a relatively large area. Further, since a portion of setting pin preferably extends outwardly of the clutch cover, an operator merely needs to contact the setting pin and force it into the clutch cover to properly position the positioning pin. It is not necessary to insert a set pin into each hole

DETAILED DESCRIPTION OF THE PREFERRED EMBODIMENT

Figure 1:
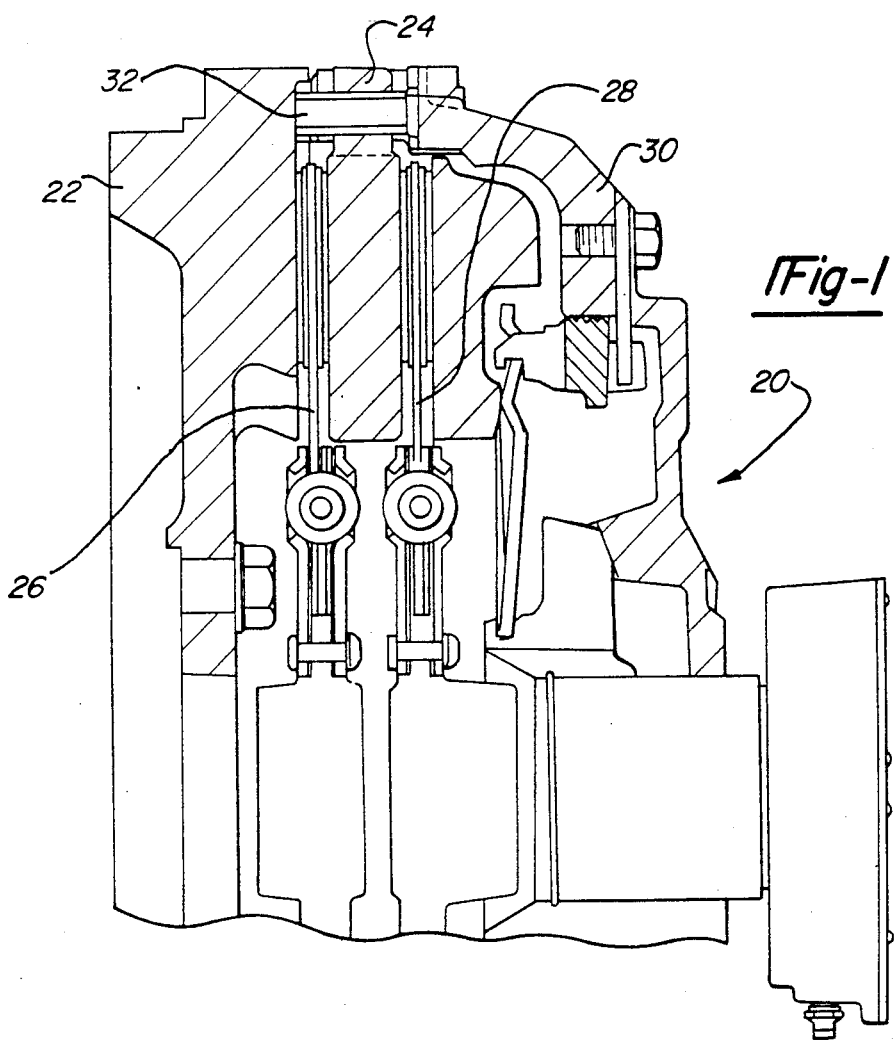
FIG. 1 is a cross-sectional view through a portion of the type of clutch to which the present invention is directed.

FIG. 1 illustrates clutch assembly 20 having flywheel 22, intermediate plate 24 and a pair of driven discs 26 and 28. A clutch cover 30 is fixed to flywheel 22 and encloses clutch 20. Positioning pins 32 frictionally mount intermediate plate 24 to properly position the intermediate plate relative to discs 26 and 28. Although one positioning pin 32 is illustrated, it should be understood that several are preferably utilized. In one preferred embodiment four such positioning pins are utilized. The function of the disclosed clutch is well known in the art and will be not further described here. Positioning pins 32 are preferably spring pins or split pins, which are a known type of pin having a central spring biasing its outer periphery radially outwardly. In this known type of pin, the outer free diameter of the pin is greater than the inner diameter of the hole in the intermediate plate that the pin passes through. As such, the plate is normally frictionally engaged at a particular point on the pin.

Intermediate plate 24 is frictionally received on positioning pin 32 such that positioning pin 32 normally retains it in a desired location. In a clutch engaged position, positioning pin 32 abuts flywheel 22 to define a stop to properly position intermediate plate 24. Upon disengagement, intermediate plate 24 and positioning pins 32 move through a small distance to the right as shown in this figure, and positioning pin 32 abuts a surface of cover 30. Should discs 26 and 28 wear to the point that intermediate plate must slide relative to positioning pin 32 to engage the clutch, intermediate plate 24 remains at its new position on positioning pin 32. This allows intermediate plate 24 to compensate for wear on discs 26 and 28. Such frictional engagement and wear compensation is known in the art.

In initially setting up clutch assembly 20, the clutch is engaged. In this position, intermediate plate 24 is accurately positioned relative to discs 26 and 28. Positioning pins 32 are then positioned in contact with flywheel 22. With wear on discs 26 and 28, intermediate plate 24 may slide relative to positioning pin 32. Even so, positioning pin 32 will still contact with flywheel 22 to define the proper clutch engaged position.

Figure 2:
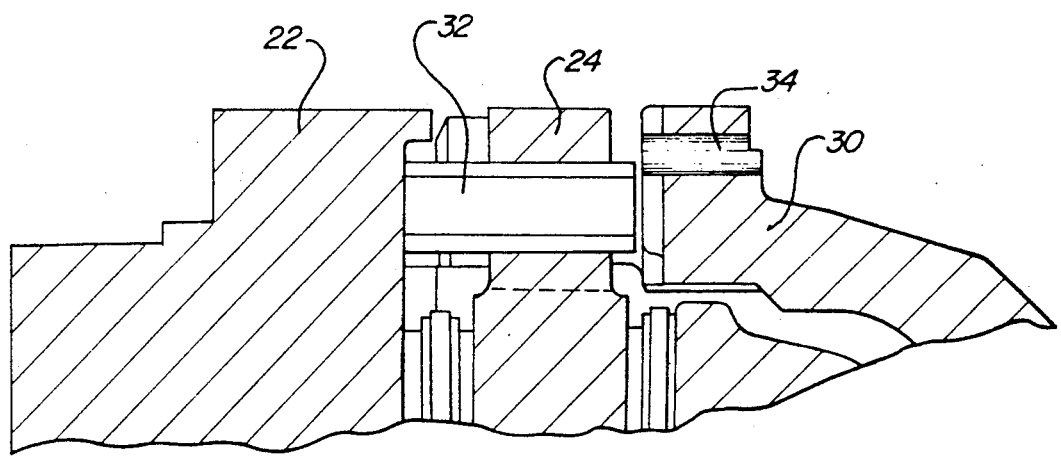
FIG. 2 is an enlarged view of a portion of the cross-sectional view shown in FIG. 1.

As shown in FIG. 2, positioning pin 32 is in contact with flywheel 22 and frictionally receives intermediate plate 24. Aperture 34 extends through cover 30 to allow access to the interior of clutch 20 such that positioning pin 32 can be properly positioned relative to intermediate plate 24.

Figure 3:
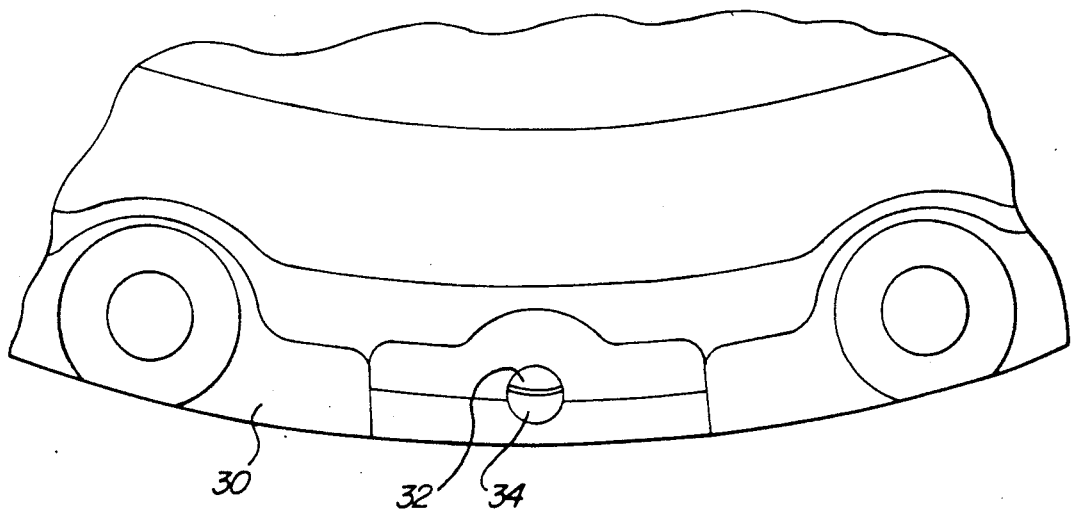
FIG. 3 is a cross-sectional view through a plane perpendicular to the plane illustrated in FIG. 1.

As shown in FIG. 3, aperture 34 may be slightly off-set of positioning pin 32. In this way, positioning pin 32 is accessible from outside of cover 30 while at the same time, aperture 34 does not interfere with movement of positioning pin 32. This structure is somewhat like the prior art clutches described above.

Figure 4:
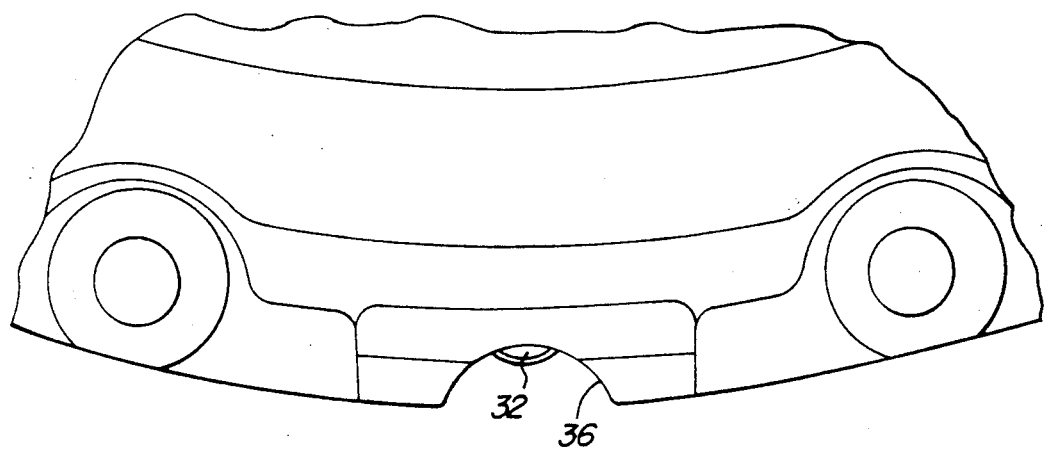
FIG. 4 is a view similar to that shown in FIG. 3, but showing an alternative inventive embodiment.

An alternative embodiment that forms a portion of the present invention is illustrated in FIG. 4. As shown in FIG. 4, notch 36 replaces cylindrical aperture 34.

Figure 5:
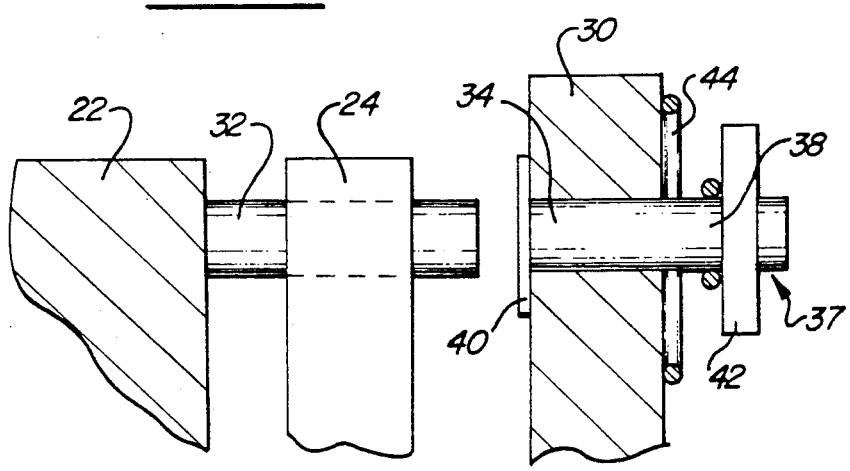
FIG. 5 is a view similar to that shown in FIG. 2, but showing an improved arrangement according to the present invention.

Setting pin assembly 37 is illustrated in FIG. 5 and includes setting pin 38 received within cylindrical aperture 34. Enlarged portion 40 rests against an interior face of clutch cover 30 while second enlarged portion 42 is formed at a position outside of clutch cover 30. Conical spring 44 is received between enlarged portion 42 and an outer face of clutch cover 30.

Conical spring 44 forces setting pin 38 outwardly of clutch cover 30. Enlarged portion 40 prevents setting pin 38 from moving outwardly of aperture 34. When it is desired to position positioning pin 32, the clutch is engaged such that intermediate plate 24 is gripped by discs 26 and 28. One then hits setting pin 38 with a hammer or similar tool and forces it inwardly to contact positioning pin 32. This contact causes positioning pin 32 to move relative to intermediate plate 24. Positioning pin 32 may preferably be forced against flywheel 22.

Once positioning pin 32 has been properly positioned, the hammer, of course, no longer contacts setting pin 38, which is biased outwardly of cover 30. Since setting pin 38 remains in aperture 34, aperture 34 may be relatively large and also coaxial with positioning pin 32. Enlarged portion 40 covers aperture 34 such that the aperture will not interfere with movement of positioning pin 32 to the clutch disengaged position.

In the prior art systems, aperture 34 was either off-set from the axis of positioning pin 32, or of a smaller diameter than positioning pin 32, such that it did not interfere with the movement of pin 32. This is somewhat undesirable since it makes it difficult to transmit a force to positioning pin 32 that is coaxial and over a relatively large surface area.

With the arrangement illustrated in FIG. 5, setting pin 38 transmits a force to positioning pin 32 over the relatively large surface area of enlarged portion 40. Further since setting pin 38 remains in aperture 34, closing the aperture, it is possible to have setting pin 38 be coaxial to positioning pin 32 to ensure that the force transmitted to positioning pin 32 is along the proper axis.

A preferred embodiment of the present invention has been disclosed, however, a worker of ordinary skill within the art would recognize that certain modifications would come within the scope of this invention. For this reason, the following claims should be studied in order to determine the true scope and content of the present invention.

We claim:

1. A clutch comprising:
   at least two discs and a intermediate plate disposed between said two discs for selective frictional engagement to transmit drive, said intermediate plate carrying at least one positioning pin mounted in at least one opening formed through said intermediate plate for properly spacing said intermediate plate relative to said two discs;

a clutch cover, said cover having at least one aperture at least partially aligned with said at least one positioning pin; and at least one setting pin extending along an axis slidably and non-removably mounted in said aperture and extending outwardly of said clutch cover such that an axial force can be directed into said at least one setting pin at a position outwardly of said clutch cover to transmit a force into said at least one positioning pin to properly position said at least one positioning pin.

2. A clutch as recited in claim 1, wherein there are a plurality of both said positioning and setting pins.

3. A clutch as recited in claim 2, wherein each said setting pin includes means to prevent its removal from said clutch cover.

4. A clutch as recited in claim 3, wherein said means to prevent the removal of said setting pins including enlarged portions formed on each side of said apertures in said clutch cover, said enlarged portions preventing movement of said setting pins relative to said clutch cover beyond a limited axial distance.

5. A clutch as recited in claim 4, wherein a spring is disposed between said clutch cover and said enlarged portion on an outside surface of said clutch cover, said spring biasing said setting pins outwardly of said clutch cover.

6. A clutch as recited in claim 1, wherein a spring biases said at least one setting pin outwardly of said clutch cover.

7. A clutch as recited in claim 1, wherein the clutch further includes a flywheel, with said flywheel being disposed at one end of said two discs and said cover being disposed on the opposed end of said two discs, and said proper position of said at least one positioning pin being in contact with said flywheel when the clutch is engaged.

8. A clutch as recited in claim 1, wherein said at least one setting pin has a surface area at an end inside said clutch cover that is greater than a surface area of said at least one positioning pin facing said end.

9. A clutch as recited in claim 1, wherein said axis that said at least one setting pin extends along that is coaxial to an axis of said at least one positioning pin.

10. A method of initially setting the location of an intermediate plate disposed between two discs in a clutch comprising the steps of:
1) slidably disposing an intermediate plate between two discs on at least one positioning pin;
2) enclosing the clutch with a cover such that access to the at least one positioning pin is limited;
3) forming at least one aperture in the clutch cover that is at least partially aligned with the at least one positioning pin such that the positioning pin is accessible from outside of the clutch and slidably disposing at least one setting pin that extends outwardly of the clutch within the at least one aperture;
4) engaging the clutch;
5) contacting the setting pin outside of the clutch cover by applying a force to the setting pin forcing it inwardly against the positioning pin to properly position the positioning pin; and
6) removing the force from the setting pins, but retaining the setting pin in the aperture.

11. A method as recited in claim 10, wherein there are a plurality of the positioning pins, apertures and setting pins.

12. A method as recited in claim 11, wherein the setting pins are spring biased outwardly of the clutch cover.

13. A method as recited in claim 12, wherein the clutch also includes a flywheel and the proper position of each positioning pin is against the flywheel when the clutch is engaged.

14. A method as recited in claim 13, wherein the setting pins each have enlarged portions at both ends of the clutch cover.

15. A clutch comprising:
at least two discs, and an intermediate plate disposed between said two discs for selective frictional engagement to transmit drive, said intermediate plate carrying a plurality of positioning pins mounted in openings formed through said intermediate plate for properly spacing said intermediate plate relative to said two discs;

a clutch cover, said clutch cover having apertures of a first cross-sectional area coaxial to said positioning pins; and setting pins slidably mounted in each of said apertures, and extending outwardly of said clutch cover such that said setting pins can be contacted outwardly of said clutch cover and that a force can be transmitted to said positioning pins to properly position said positioning pins, said setting pins having an inner end of a second cross-sectional area within said clutch cover, said second cross-sectional area being greater than said first cross-sectional area.

16. A clutch as recited in claim 15, wherein said positioning pins having a third cross-sectional area facing said inner end of said setting pins, said second cross-sectional area being greater than said third cross-sectional area.

17. A clutch as recited in claim 15, wherein said setting pins are spring-biased outwardly of said clutch cover.

18. A clutch as recited in claim 1, wherein said setting pin is biased outwardly of said clutch cover.

* * * * *

UNITED STATES PATENT AND TRADEMARK OFFICE
CERTIFICATE OF CORRECTION

PATENT NO. : 5,080,212

DATED : January 14, 1992

INVENTOR(S) : Flotow, et. al.

It is certified that error appears in the above-identified patent and that said Letters Patent is hereby corrected as shown below:

Column 5, line 43, delete "that" (second occurrence).

Signed and Sealed this

Twenty-fifth Day of May, 1993

Attest:

MICHAEL K. KIRK

Attesting Officer  Acting Commissioner of Patents and Trademarks